(12) United States Patent  
Shioguchi

(10) Patent No.: US 12,511,031 B2  
(45) Date of Patent: Dec. 30, 2025

(54) INFORMATION DISPLAY DEVICE AND PROGRAM

(71) Applicant: Faurecia Clarion Electronics Co., Ltd., Saitama (JP)

(72) Inventor: Takuma Shioguchi, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 258 days.

(21) Appl. No.: 18/181,050

(22) Filed: Mar. 9, 2023

(65) Prior Publication Data

US 2023/0315280 A1    Oct. 5, 2023

(30) Foreign Application Priority Data

Mar. 31, 2022   (JP) .................................. 2022-060315

(51) Int. Cl.
  *G06F 3/0488* (2022.01)
  *G06F 3/04815* (2022.01)
  *G06F 3/0484* (2022.01)

(52) U.S. Cl.
  CPC ........ *G06F 3/0488* (2013.01); *G06F 3/04815* (2013.01); *G06F 3/0484* (2013.01)

(58) Field of Classification Search
  None
  See application file for complete search history.

(56) References Cited

U.S. PATENT DOCUMENTS

| 5,305,435 A | * | 4/1994 | Bronson | ............... G06F 3/0481 |
| | | | | 715/788 |
| 5,874,958 A | * | 2/1999 | Ludolph | ................. G06F 9/451 |
| | | | | 715/862 |

(Continued)

FOREIGN PATENT DOCUMENTS

| JP | 2007-017268 B2 | 1/2007 |
| JP | 2014-174922 A | 9/2014 |

(Continued)

OTHER PUBLICATIONS

Japanese Office Action issued on Oct. 28, 2025 for Japanese Patent Application No. 2022-060315.

*Primary Examiner* — Ryan Barrett  
(74) *Attorney, Agent, or Firm* — Volpe Koenig

(57) ABSTRACT

An information display device comprises: an operation detecting unit for detecting a touch operation on a touch panel; an object information acquiring unit for acquiring information on objects within a predetermined search range; and a display information generating unit for generating screen information to be displayed in a display area, wherein the display information generating unit generates screen information for display in a first mode in which a plurality of types of objects are arranged around the position of the terminal itself, the object information acquiring unit acquires information on a target object that is associated with a predetermined touch operation when the operation detecting unit detects a predetermined touch operation, and the display information generating unit generates information for display in a second display mode in which information on the target object is arranged around the terminal and information on objects other than the target object is hidden.

11 Claims, 14 Drawing Sheets

(56) References Cited

U.S. PATENT DOCUMENTS

| | | | |
|---|---|---|---|
| 8,265,862 B1* | 9/2012 | Zilka | G01C 21/3688 |
| | | | 455/457 |
| 9,146,129 B1* | 9/2015 | Furio | G01C 21/3679 |
| 2002/0138196 A1* | 9/2002 | Polidi | G01C 21/3682 |
| | | | 340/995.1 |
| 2003/0160815 A1* | 8/2003 | Muschetto | G06F 3/0481 |
| | | | 715/733 |
| 2006/0020903 A1* | 1/2006 | Wang | G06F 3/0481 |
| | | | 715/792 |
| 2008/0306685 A1* | 12/2008 | Bernardini | G01C 21/3682 |
| | | | 701/431 |
| 2009/0055094 A1 | 2/2009 | Suzuki | |
| 2009/0319181 A1* | 12/2009 | Khosravy | G06Q 30/02 |
| | | | 701/532 |
| 2010/0198814 A1* | 8/2010 | Petersen | H04L 67/306 |
| | | | 707/E17.109 |
| 2010/0305842 A1* | 12/2010 | Feng | G06F 16/9537 |
| | | | 701/533 |
| 2010/0333001 A1* | 12/2010 | Wild | G06F 3/04847 |
| | | | 715/764 |
| 2011/0078624 A1* | 3/2011 | Missig | G06F 3/0488 |
| | | | 345/173 |
| 2011/0283223 A1* | 11/2011 | Vaittinen | G06F 3/04815 |
| | | | 715/781 |
| 2012/0046864 A1* | 2/2012 | Zilka | G01C 21/362 |
| | | | 709/204 |
| 2013/0007089 A1* | 1/2013 | O'Donnell | G09B 29/003 |
| | | | 709/201 |
| 2013/0311916 A1* | 11/2013 | Weng | G01C 21/3664 |
| | | | 715/764 |
| 2014/0164966 A1* | 6/2014 | Kim | G06F 16/168 |
| | | | 715/769 |
| 2014/0244165 A1* | 8/2014 | Bells | G01C 21/367 |
| | | | 701/454 |
| 2014/0365945 A1 | 12/2014 | Karunamuni et al. | |
| 2015/0006289 A1* | 1/2015 | Jakobson | G06Q 30/0256 |
| | | | 705/14.54 |
| 2016/0170620 A1* | 6/2016 | Roytblat | G09B 29/007 |
| | | | 715/738 |
| 2016/0178383 A1* | 6/2016 | Mays | G01C 21/3682 |
| | | | 701/408 |
| 2016/0330150 A1* | 11/2016 | Joe | G06F 3/0486 |
| 2017/0343372 A1* | 11/2017 | Vandanapu | G01C 21/3602 |
| 2018/0005434 A1* | 1/2018 | Ren | G06T 15/205 |
| 2018/0181851 A1* | 6/2018 | Kimura | G06K 19/06 |
| 2019/0139165 A1* | 5/2019 | Valecha | G06Q 50/14 |
| 2019/0154457 A1* | 5/2019 | Mach | G01C 21/3476 |
| 2019/0354256 A1 | 11/2019 | Karunamuni et al. | |
| 2021/0173887 A1* | 6/2021 | Petersen | G06F 16/9536 |
| 2022/0248180 A1* | 8/2022 | Gadipuuri | H04W 4/029 |
| 2025/0170891 A1* | 5/2025 | Shioguchi | B60K 35/10 |

FOREIGN PATENT DOCUMENTS

| | | |
|---|---|---|
| JP | 2016-511854 A | 4/2016 |
| JP | 2017-174157 A | 9/2017 |
| WO | 2014/106739 A1 | 7/2014 |

* cited by examiner

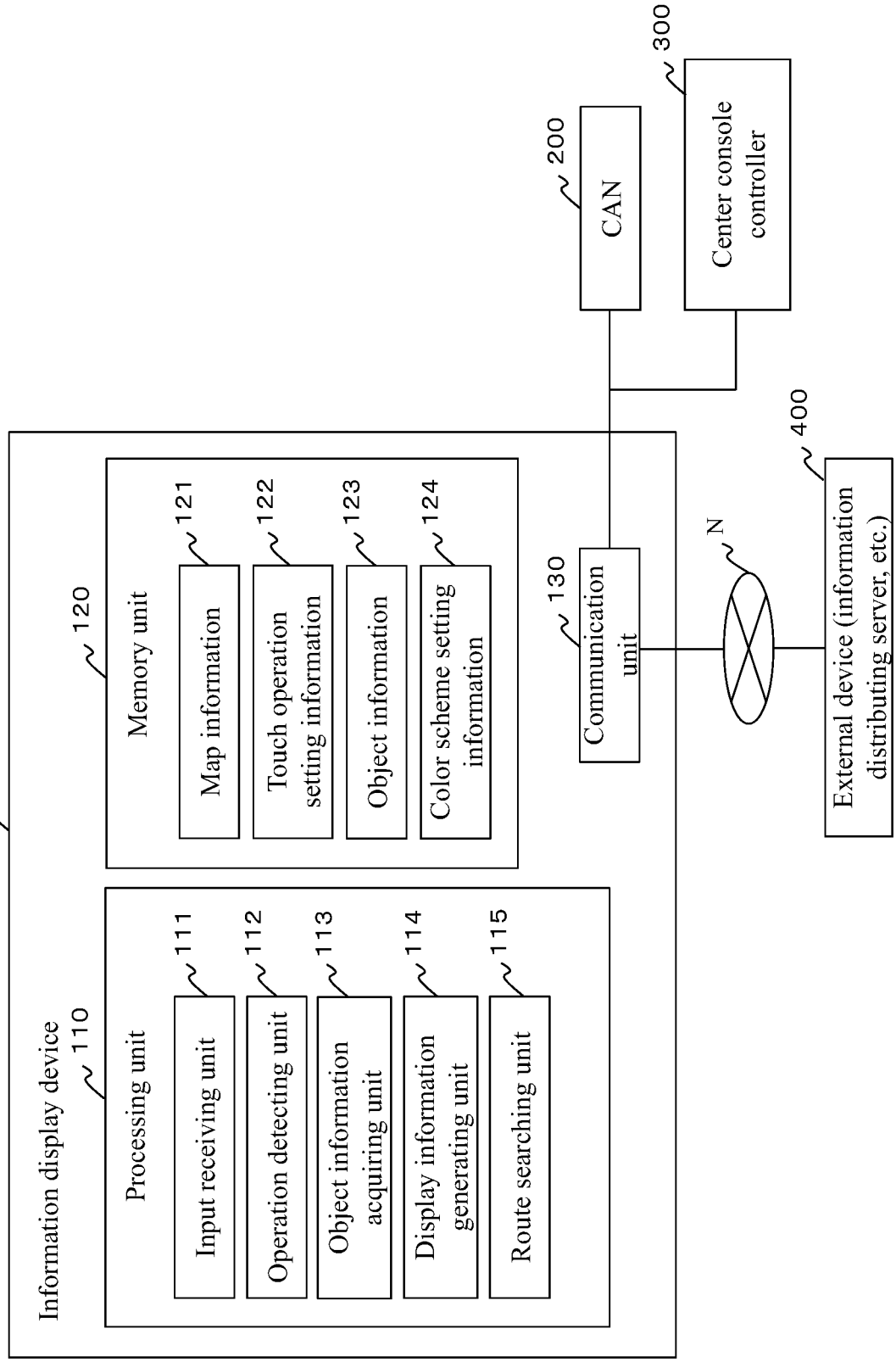

| Touch Start Position | Swipe Direction | Target Object |
|---|---|---|
| Area A | Rightward | Contact Charge-Type Electric Station |
| Area B | Downward | Non-Contact Charge-Type Electric Station |
| Area C | Leftward | Battery Replacement-Type Electric Station |
| Area D | Upward | All-Type Electric Station |

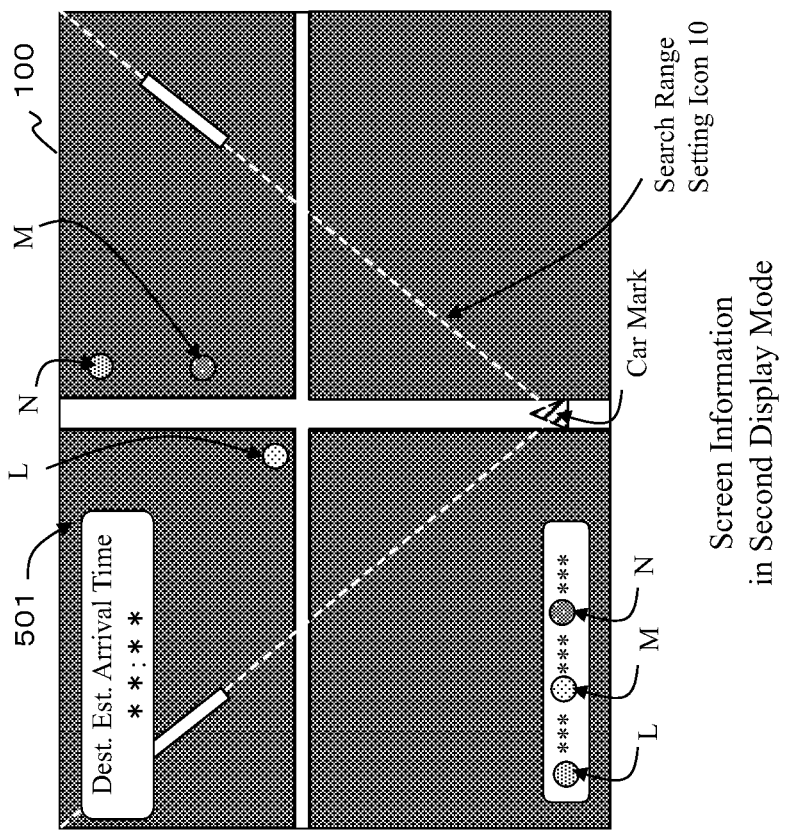
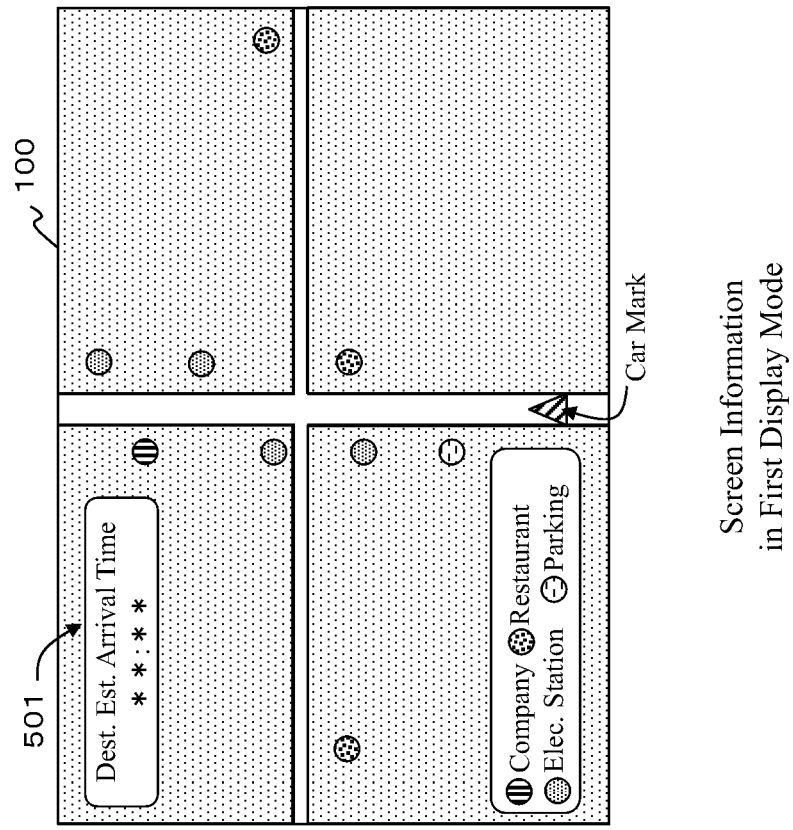
FIG.3A — Screen Information in First Display Mode
FIG.3B — Screen Information in Second Display Mode

| Touch Start Position | Swipe Direction | Target Object |
|---|---|---|
| Area A | Rightward | Gas Station with Charging Facilities |
| Area B | Downward | Parking Lot |
| Area C | Leftward | Convenience Store |
| Area D | Upward | Restaurant with Parking |

| Touch Start Position | Swipe Direction | Target Object |
|---|---|---|
| Area O | Rightward | Gas Station with Charging Facilities |
| Area P | Downward | Parking Lot |
| Area Q | Leftward | Convenience Store |
| Area R | Upward | Restaurant with Parking |
| Area S | Rightward | Fast Food Restaurant with Parking |
| Area T | Downward | Café with Parking |
| Area U | Leftward | Public Park |
| Area V | Upward | Lodging |

FIG.11B

| Touch Start Position | Swipe Direction | Target Object |
|---|---|---|
| Area O | Rightward | Gas station with Charging Facilities (GS) |
| Area P | Downward | Parking Lot (P) |
| Area Q | Leftward | Convenience Store (CO) |
| Area R | Upward | Restaurant with Parking (RE) |
| Area S | Rightward | Fast Food Restaurant with Parking (FF) |
| Area T | Downward | Café with Parking (CA) |
| Area U | Leftward | Public Park (PA) |
| Area V | Upward | Lodging (HT) |

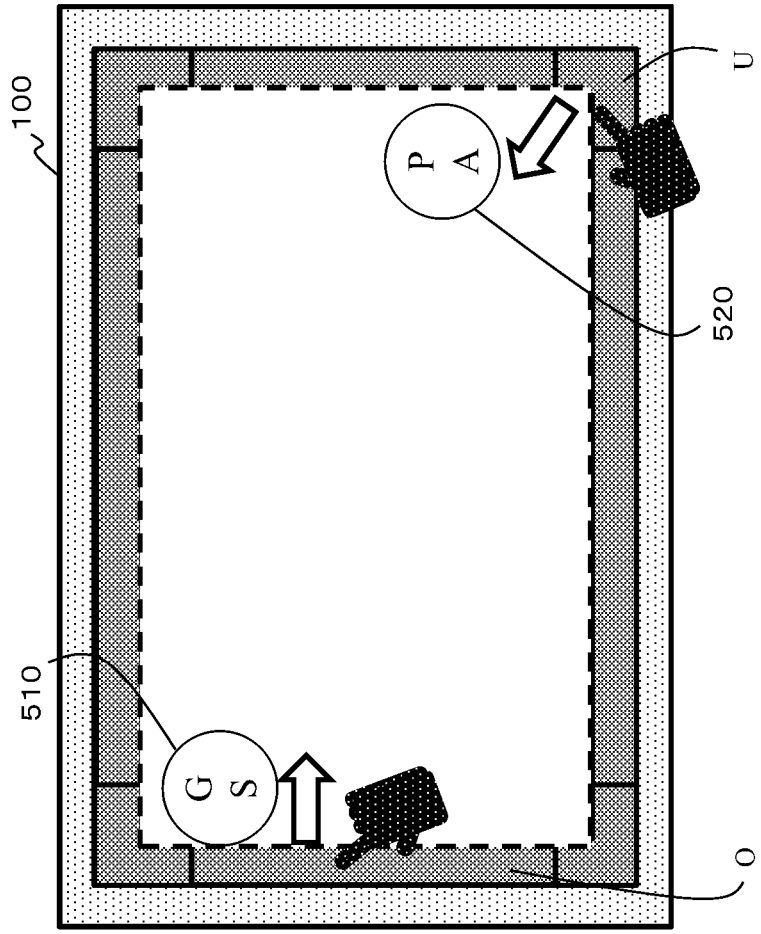

FIG.11A

INFORMATION DISPLAY DEVICE AND PROGRAM

FIELD OF INVENTION

The present invention relates to an information display device and program.

BACKGROUND

Patent Document 1 relates to a navigation device, which is described as follows: "Only facility marks for facilities present along a route are displayed on a road map when a road map displayed on a display monitor with a touch panel has been pressed while route guidance is being provided for the specified route that has been set. Only a facility mark for a predetermined facility selected by a passenger is displayed on the road map when route guidance is being provided for the recommended route set in a route calculation performed by a control circuit."

CITATION LIST

Patent Literature

[Patent Document 1] JP 2007-017268 A

SUMMARY

Patent Document 1 discloses a technique for displaying an icon indicating a facility that has been set on a map after the user has set a facility type icon that the user wishes to be displayed. During the setting operation, the user had to select and input the facility type icon to be displayed. Here, the user has to select a facility type each time the user wishes to display a different facility type icon. However, this setting operation is complicated for an operation performed while driving and thus is not preferable.

Therefore, it is an object of the present invention to display information of an object to be displayed in a display form that is easier to see by an intuitive operation.

Solution to Problem

The present application includes a plurality of means for solving at least a portion of this problem. However, the following is an example. One aspect of the present invention that solves this problem is an information display device comprising: an operation detecting unit for detecting a touch operation on a touch panel; an object information acquiring unit for acquiring information on objects within a predetermined search range; and a display information generating unit for generating screen information to be displayed in a display area, wherein the display information generating unit generates screen information for display in a first display mode in which a plurality of types of objects are arranged around the position of the terminal itself, the object information acquiring unit acquires information on a target object that is an object of a type associated with a predetermined touch operation when the operation detecting unit has detected a predetermined touch operation on the touch panel, and the display information generating unit generates screen information for display in a second display mode in which information on the target object is arranged around the position of the terminal itself and information on objects other than the target object is hidden.

Effect of the Invention

According to the present invention, the information of the object to be displayed can be displayed in a display form that is easier to see by an intuitive operation.

Other problems, configurations, and effects will become clear in the following explanation of embodiments.

BRIEF DESCRIPTION OF DRAWINGS

FIG. 1 shows an example of the configuration of the information display device.

FIGS. 3A and 3B shows an example used to compare the color scheme in the first display mode with the color scheme in the second display mode.

FIGS. 11A and 11B shows a detection area with the touch start position and the corresponding operation assistance icon.

DETAILED DESCRIPTION OF THE PREFERRED EMBODIMENTS

Figures 2A, 2B:
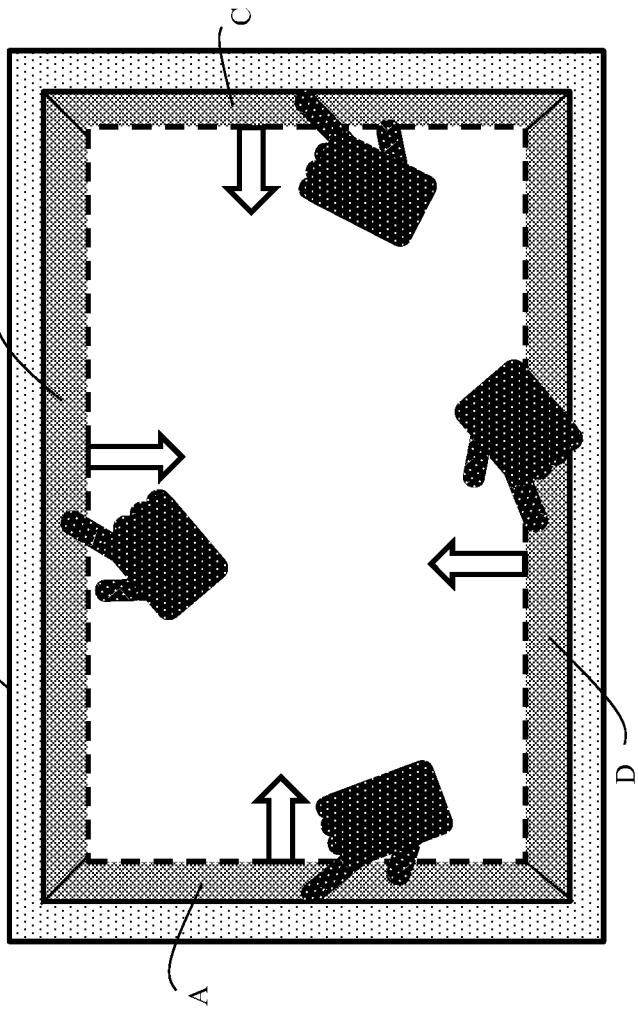
FIGS. 2A and 2B shows the relationship between touched positions and swipe operations and the types of target objects displayed in the second display mode.

The following is a description of embodiments of the present invention with reference to the drawings.

FIG. 1 shows an example of the configuration of the information display device 100 in this embodiment. This information display device 100 is an in-vehicle "display audio" device in which application software (or an "app") has been installed to realize, for example, navigation functions such as map display and route guidance using map information 121, audio functions, and telephone functions. Note that the information display device 100 may be a navigation device with dedicated navigation functions such as route searches and route guidance along recommended routes or the display of road traffic information, or may be a smartphone or tablet with applications installed to perform various functions.

When displaying a map or route guidance on a map, the information display device 100 in the present embodiment displays screen information in the normal display mode (sometimes referred to as the "first display mode" below) in which icons representing various objects (primarily facilities and locations in the present embodiment) such as gas stations and convenience stores are arranged on the map. When a predetermined touch operation is detected on the touch panel mounted in the display, the information display device 100 displays screen information in a second display mode in which icons indicating objects (sometimes referred to as the "target objects" below) of a type corresponding to the touch operation near the terminal itself (around the position of the vehicle equipped with the information display device 100 or around the position of the user who owns a smartphone serving as the information display device 100) are arranged on the map.

Note that the second mode is a display mode that restricts the display of (hides) objects other than the target object associated with the touch operation among the types of objects displayed in the first display mode. In other words, when the display mode transitions from the first display mode, that is, the normal display mode, to the second display mode, the icon of the target object corresponding to the touch operation is displayed on the map in the screen information displayed in the second display mode, and icons representing other objects are no longer displayed.

The information display device 100 switches between the first display mode, that is, the normal display mode, and a second display mode, which displays information on target objects based on touch operations performed by the user, and displays screen information for the corresponding display mode. In this way, the user can display information on objects to be checked on a map by performing an intuitive operation such as a touch operation on a touch panel. This can make the information display device 100 easier to use, and thus contribute to safer driving.

The information display device 100 has a processing unit 110, a memory unit 120, and a communication unit 130 to execute this processing.

The processing unit 110 is a functional unit that performs the processing executed by the information display device 100. Specifically, the processing unit 110 has an input receiving unit 111, an operation detecting unit 112, an object information acquiring unit 113, a display information generating unit 114, and a route searching unit 115.

The input receiving unit 111 is a functional unit that receives instructions inputted from a user via an input device provided in the information display device 100 (a touch panel, hardware switches, or a controller in a center console of the vehicle in the present embodiment).

The operation detecting unit 112 is a functional unit that detects a touch operation on the touch panel. Specifically, the operation detecting unit 112 detects various touch operations on the touch panel, such as a swipe operation or a drag operation in which a finger slides while touching the panel.

After detecting that the touch panel has been touched at a predetermined position and a swipe operation corresponding to the touched position in a predetermined direction has been detected, the operation detecting unit 112 uses information in the memory unit 120 (touch operation setting information 122 to be described later) to identify the type of target object corresponding to the touched position and swipe direction.

FIGS. 2A and 2B shows the relationship between touched positions and swipe operations and the types of target objects displayed in the second display mode. After a touch has been detected in one of areas A to D (touch start position detecting areas) with a predetermined width along all four sides in the display area provided inside the display escutcheon and a swipe operation performed in a predetermined direction has been detected, the operation detecting unit 112 identifies the type of target object corresponding to the touched position and swipe direction.

Specifically, when a touch operation in area A has been detected and a swipe operation in the direction of area C (rightward) has been detected, the operation detecting unit 112 identifies the type of target object associated with the touched position and swipe direction (an electric charging station that supports the "contact charging type" charging method in the present embodiment). When a touch operation in area B has been detected and a swipe operation in the direction of area D (downward) has been detected, the operation detecting unit 112 identifies the type of target object associated with the touched position and swipe direction (an electric charging station that supports the "non-contact charging type" charging method in the present embodiment).

When a touch operation in area C has been detected and a swipe operation in the direction of area A (leftward) has been detected, the operation detecting unit 112 identifies the type of target object associated with the touched position and swipe direction (an electric charging station that supports the "battery swap out type" charging method in the present embodiment). When a touch operation in area D has been detected and a swipe operation in the direction of area B (upward) has been detected, the operation detecting unit 112 identifies the type of target object associated with the touched position and swipe direction (an electric charging station that supports all types of charging methods in the present embodiment).

The description now returns to FIG. 1. The object information acquiring unit 113 is a functional unit that acquires information on the target object to be displayed in the second display mode from among target objects of the type specified by the operation detecting unit 112. Specifically, the object information acquiring unit 113 acquires information on target objects included in the preset search range in the vicinity of the vehicle position from among the specified type of target objects.

An example of a search range is a fan-shaped inner range with a predetermined center angle (for example, from 45 degrees to 90 degrees) set in the forward traveling direction of the vehicle when the vehicle is traveling toward a destination. When the vehicle is parked, the search range is all directions around the vehicle position. In both cases, the target objects located within the display area of the display are searched based to the display scale of the map. The search range setting information (not shown) may be stored in the memory unit 120 beforehand.

The object information acquiring unit 113 acquires position information and facility information on target objects in the search range from information stored in the memory unit 120 (object information 123 to be described later). Note that the object information acquiring unit 113 may acquire information on target objects from an external device 400 (such as an information distribution server) via a communication unit 130.

The display information generating unit 114 is a functional unit that generates screen information (display information) to be displayed on the display. Specifically, the display information generating unit 114 generates screen information in which a plurality of types of objects such as gas stations are arranged on a map in the first display mode, that is, the normal display mode. When the operation detecting unit 112 has detected a predetermined touch operation, the display information generating unit 114 generates screen information displayed in the second display mode in which target objects of the type corresponding to the touched position and swipe operation are arranged on the map.

The display information generating unit 114 also determines the color scheme of the generated screen information using information in the memory unit 120 (color scheme setting information 124 to be described later). The screen information in the second display mode has a different color scheme from that in the first display mode.

FIGS. 3A and 3B shows an example used to compare the color scheme in the first display mode with the color scheme in the second display mode. As shown in the figure, the map displayed in the second display mode has a color scheme that emphasizes the target object. Specifically, a darker color scheme than that of the first display mode (black in this example) is applied as the background color of the map displayed in the second display mode so that icons of the target objects are emphasized. The target objects L-M are also given different colors based on proximity to the vehicle position so that they are more easily identifiable.

The route searching unit 115 is a functional unit that searches for a recommended route from the departure point to the destination entered by the user using a predetermined method such as Dijkstra's algorithm. The route searching unit 115 also calculates the distance to the destination and the expected arrival time based on the map information 121 and the searched recommended route, and performs another route search when a waypoint has been added, calculating the distance to the destination and the expected arrival time via the waypoint.

The memory unit 120 will now be described. The memory unit 120 is a functional unit that stores various types of information. Specifically, the memory unit 120 stores map information 121, touch operation setting information 122, object information 123, and color scheme setting information 124.

The map information 121 includes various types of information related to the structure of the map, such as link information that stores detailed information about roads in each predetermined area of the map.

The touch operation setting information 122 is information in which touch operations performed on the touch panel and the types of target objects displayed in the second display mode based on touch operations are associated and registered. Specifically, in touch operation setting information 122, touched positions and swipe directions (such as touched position=area A and swipe direction=rightward in FIG. 2A) are associated and registered with the corresponding types of objects (such as electric charging stations that support the "contact charging type" charging method in FIG. 2B).

Object information 123 is information about objects displayed on the map. Specifically, object position information, facility information, etc. are registered in the object information 123.

The color scheme setting information 124 is setting information related to the color scheme of screen information displayed on the display. Specifically, settings related to color schemes for the map background, roads, and icons indicating objects, etc. are registered in the color scheme setting information 124.

The communication unit 130 will now be described. The communication unit 130 is a functional unit that exchanges information with an external device 400 via a communication network N such as the Internet. For example, the communication unit 130 can acquire information about objects from an information distribution server. The communication unit 130 also acquires information outputted from an electronic control unit (ECU) and various vehicle-mounted devices via a controller area network (CAN) 200.

An example of a functional configuration for the information display device 100 was described above.

[Explanation of Operations]

The information display processing executed by the information display device 100 will now be explained.

Figure 4:
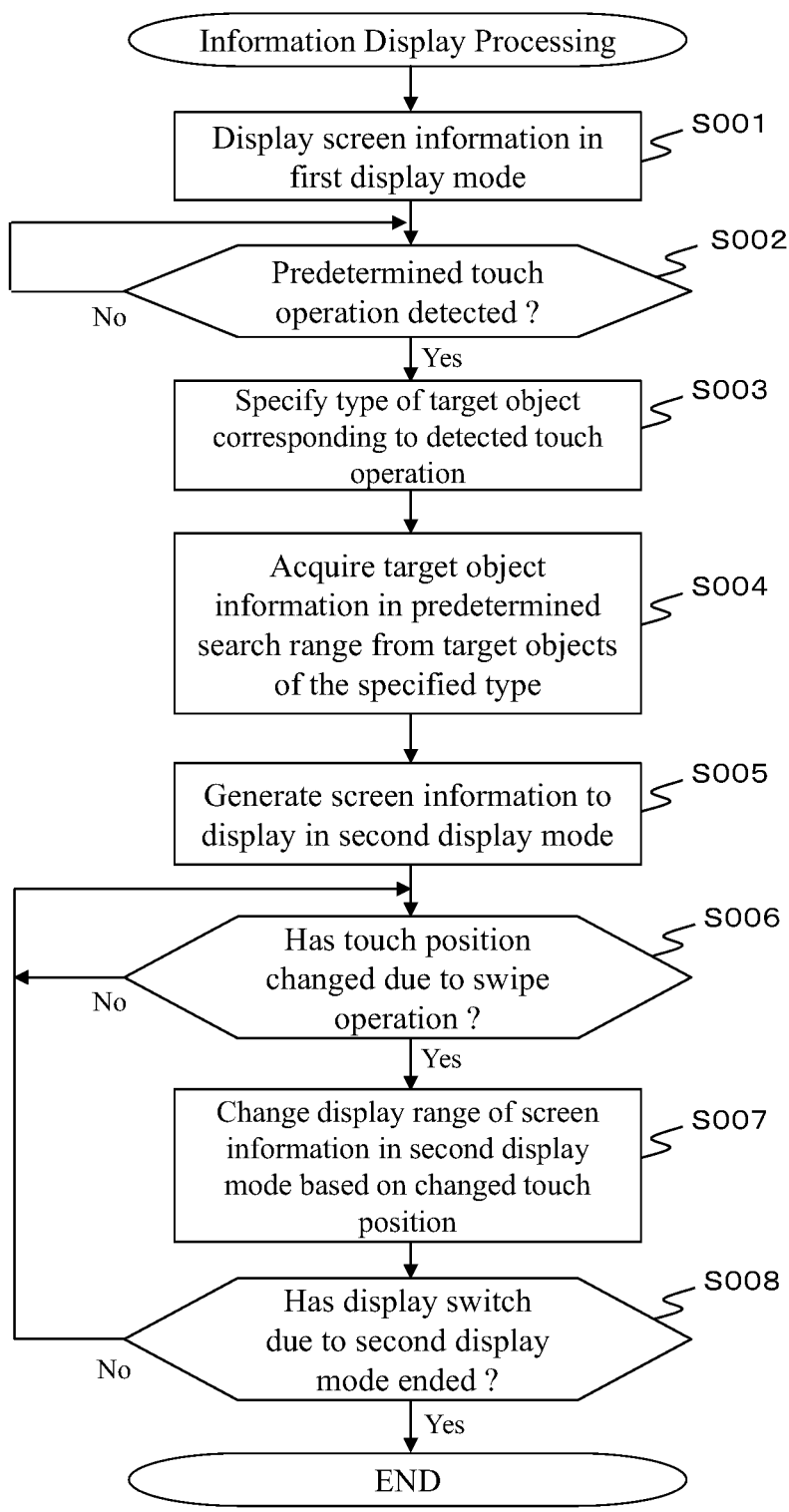
FIG. 4 is a flowchart showing an example of information display processing.
Figure 5:
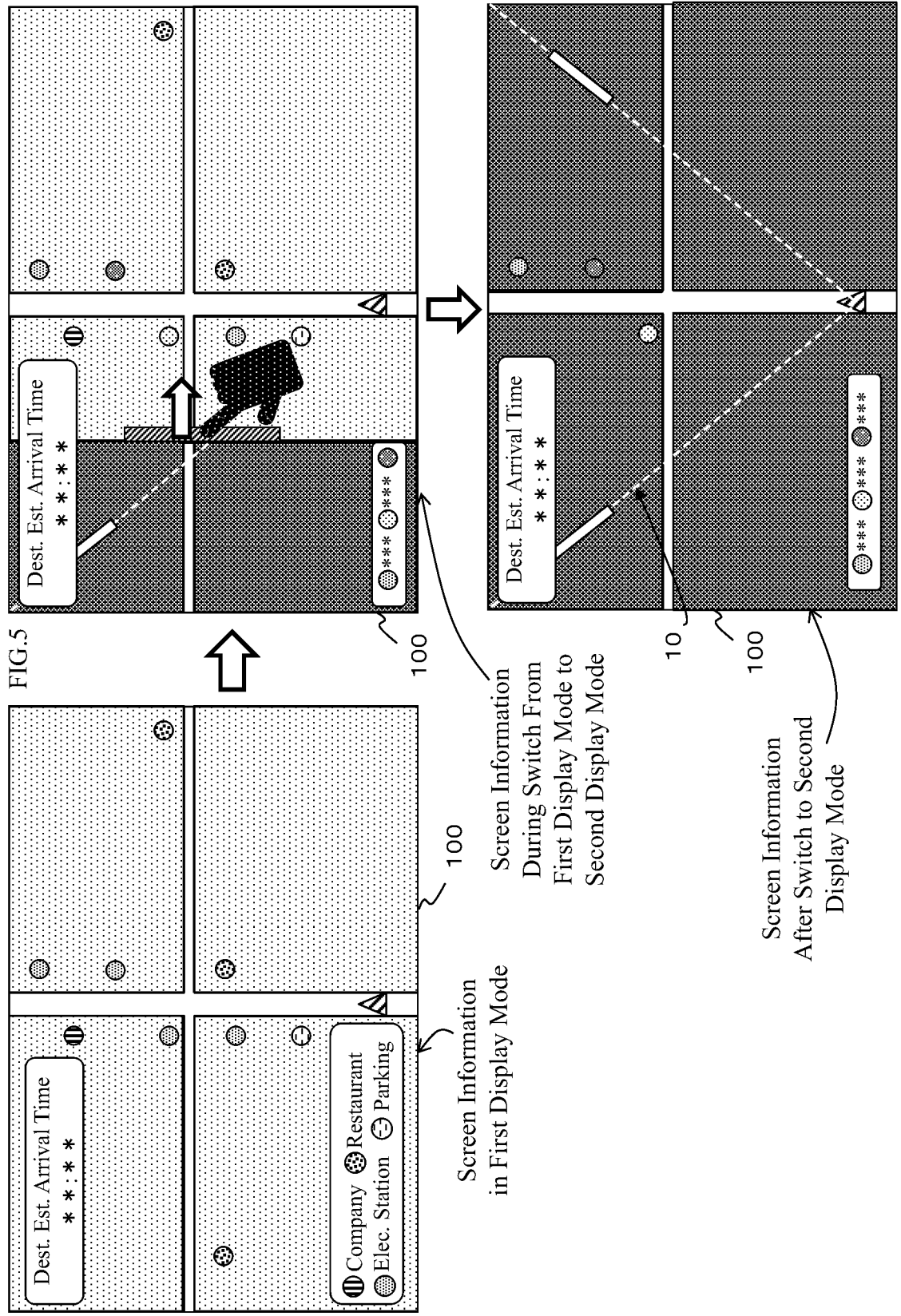
FIG. 5 shows an example of screen transition when switching from the first display mode to the second display mode.

FIG. 4 is a flowchart showing an example of information display processing. FIG. 5 shows an example of screen transition when switching from the first display mode to the second display mode. Note that the information display process can be started up, for example, when the information display device 100 is activated.

When the processing starts up, the display information generating unit 114 displays screen information in the first display mode related to the function to be performed (such as the map display function or the route guidance function in the present embodiment) (step S001). Specifically, the display information generating unit 114 generates screen information in the first display mode in which icons representing various objects are arranged on a map. At this time, the display information generating unit 114 uses color scheme setting information 124 to determine the color scheme for the map background, the roads, and icons indicating objects in the first display mode. As a result, the screen information shown in FIG. 5 (upper left figure) is displayed.

Next, the operation detecting unit 112 determines whether or not a predetermined touch operation has been detected (step S002). Specifically, after it has been detected that one of areas A to D in FIG. 2A has been touched, the operation detecting unit 112 determines whether or not a swipe operation performed in a predetermined direction has been detected.

When such a touch operation has not been detected (No in step S002), the operation detecting unit 112 performs the processing in step S002 again. When such a touch operation has been detected (Yes in step S002), the operation detecting unit 112 advances to the processing in step S003.

In step S003, the operation detecting unit 112 uses touch operation setting information 122 to identify the type of target object corresponding to the detected touch operation.

Next, the object information acquiring unit 113 acquires information on target objects within the predetermined search range among target objects of the specified type (step S004). Specifically, the object information acquiring unit 113 identifies the traveling state of the vehicle (traveling or parked) based on information acquired from the ECU via the communication unit 130, and specifies a search range corresponding to the specified traveling state. The object information acquiring unit 113 also uses map information 121 and object information 123 to identify target objects in the specified search range, and acquires position information etc. on the specified target objects.

Next, the display information generating unit 114 generates screen information to be displayed in the second display mode (step S005). Specifically, the display information generating unit 114 generates screen information in which icons of the specified target objects are arranged on the map. At this time, the display information generating unit 114 uses color scheme setting information 124 to determine the color scheme for the map background, the roads, and icons indicating objects in the second display mode.

Next, the operation detecting unit 112 determines whether or not the touched position in the swipe operation has been updated (step S006). When it has been determined that the touched position has not been updated (No in step S006), the operation detecting unit 112 performs the processing in step S006 again. However, when it has been determined that the touched position has been updated (Yes in step S006), the operation detecting unit 112 advances the processing to step S007.

In step S007, the display information generating unit 114 updates the display range in the screen information for the second display mode based on the updated touched position. Specifically, as shown in FIG. 5 (upper right figure), when the touched position in the swipe operation has moved (to the right in the example shown in the figure), the display information generating unit 114 enlarges the display area in the screen information for the second display mode based on the amount of movement, and displays the screen information for the second display mode in the display area.

Next, the display information generating unit 114 determines whether or not the switch to the second display mode has been completed (step S008). Specifically, the display information generating unit 114 determines whether or not the entire display in the display area includes screen information for the second display mode based on the updated touched position in the swipe operation.

When it has been determined that display switching has not been completed (No in step S008), the display information generating unit 114 returns to processing in step S006. However, when it has been determined that the display switching has been completed (Yes in step S008), the display information generating unit 114 ends the processing in this flow.

As a result, screen information for the second display mode shown in FIG. 5 (lower right figure) is displayed on the display. A search range setting icon 10 indicating the search range for the target object is displayed in the screen information.

The operation reception processing executed by the information display device 100 will now be described.

Figure 6:
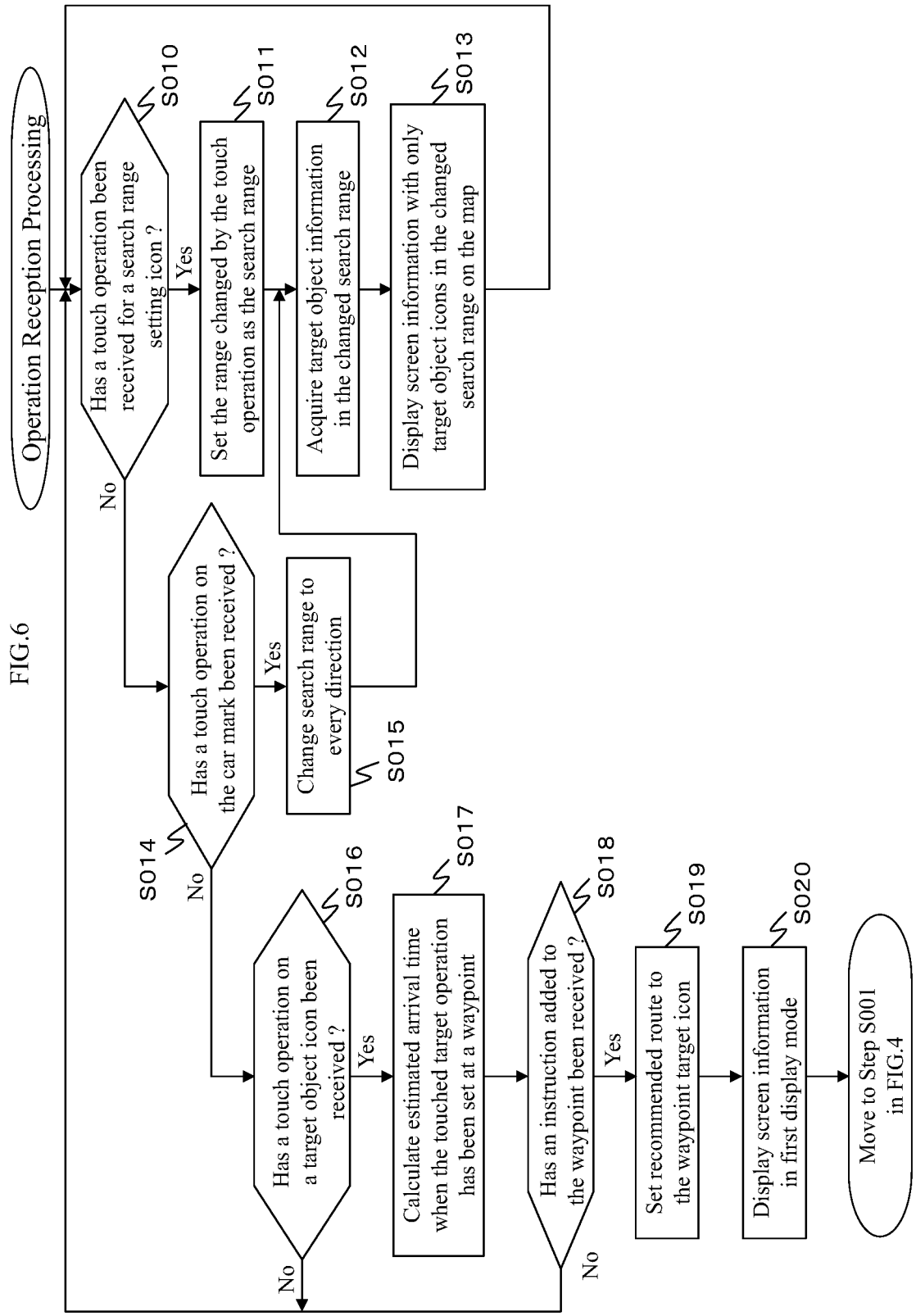
FIG. 6 is a flowchart showing an example of operation reception processing.
Figure 7:
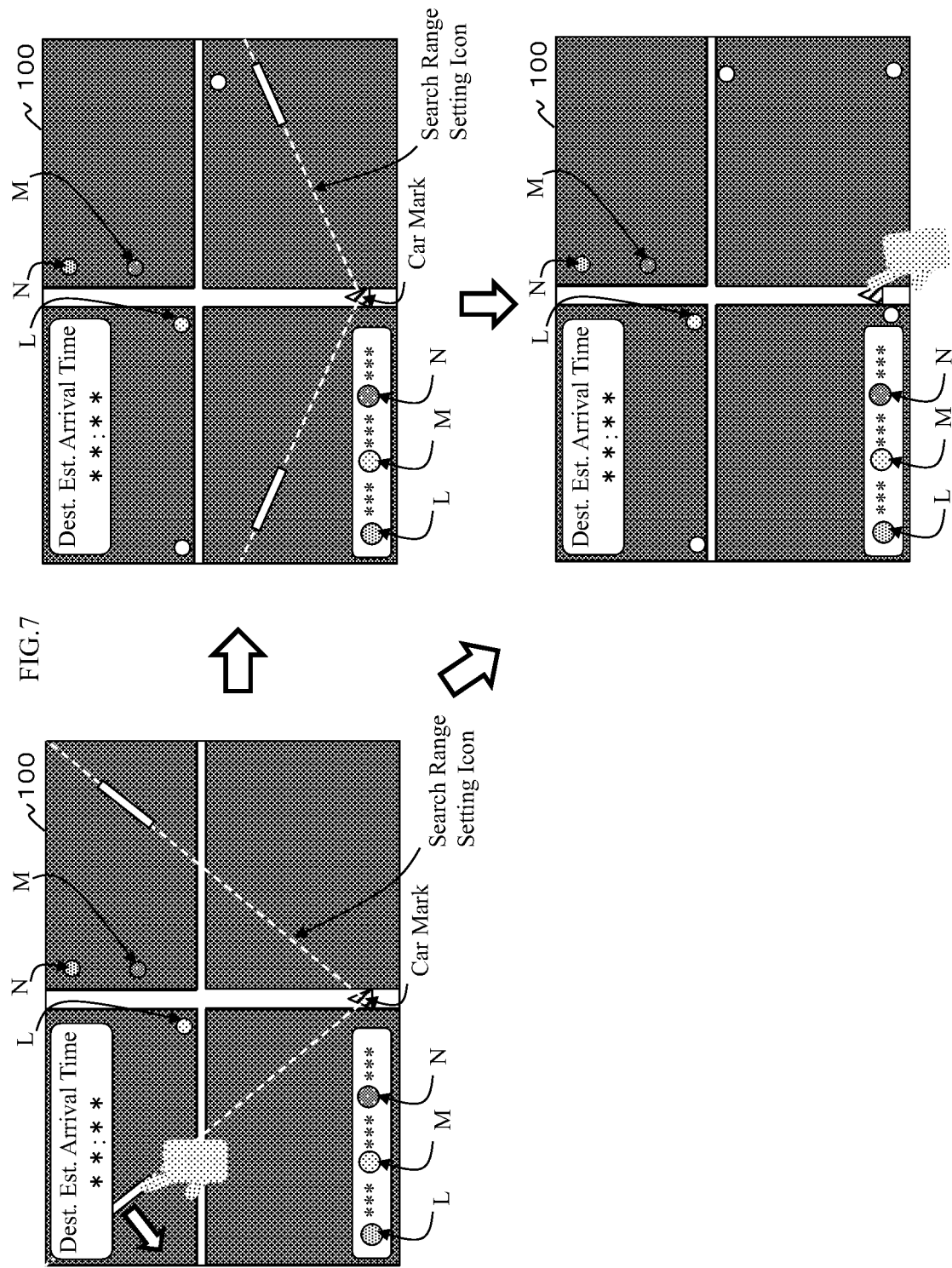
FIG. 7 shows an example of a screen for touch operations performed on screen information displayed in the second display mode.

FIG. 6 is a flowchart showing an example of operation reception processing. FIG. 7 shows an example of a screen for touch operations performed on screen information displayed in the second display mode. Note that the operation reception processing is started, for example, after switching to the second display mode has been completed (after the information display processing has been completed).

When the processing has started, the operation detecting unit 112 determines whether or not an operation in which the search range setting icon displayed on the screen information in the second display mode has been touched has been received (step S010).

When it has been determined that such a touch operation has not been received (No in step S010), the operation detecting unit 112 advances to the processing in step S014. However, when it has been determined that such a touch operation has been received (Yes in step S010), the object information acquiring unit 113 recognizes that the search range for the target object has been changed by the touch operation, and sets the range changed by the touch operation as the search range (step S011). The object information acquiring unit 113 also acquires information on the target objects in the changed search range (step S012).

As shown in FIG. 7 (upper left figure and upper right figure), the user can change the central angle of the fan-shaped search range by performing a touch operation (such as a drag operation) on the search range setting icon displayed on the screen information in the second display mode. At this time, the operation detecting unit 112 detects a touch operation on the touch panel, and the display information generating unit 114 updates display of the search range setting icon based on this touch operation.

When there is no target object in the search range, the display information generating unit 114 may change the scale of the map so that at least one target object is within the search range. This is because changing the scale of the map substantially expands the search range in the display area.

Next, the display information generating unit 114 displays screen information in which icons of target objects in the changed search range are displayed on the map (step S013), and then returns to the processing in step S010.

In step S014, the operation detecting unit 112 determines whether or not a touch operation performed on the car mark indicating the current position of the vehicle has been received. Specifically, the operation detecting unit 112 determines whether or not a touch operation has been performed on the car mark displayed in the screen information in the second display mode, and whether or not the search range for the target object has been changed.

When it has been determined that such a touch operation has not been received (No in step S014), the operation detecting unit 112 advances to the processing in step S016. However, when the operation detecting unit 112 has determined that such a touch operation has been received (Yes in step S014), the object information acquiring unit 113 changes the search range to all directions from the vehicle (step S015), and acquires information on the target object included in the changed search range (step S012).

As shown in FIG. 7 (lower right figure), the user can change the search range to all directions from the vehicle by performing a touch operation (tap operation) on the car mark indicating the current position of the vehicle. At this time, the operation detecting unit 112 detects a touch operation on the touch panel, and the display information generating unit 114 hides display of the search range setting icon based on the touch operation.

In step S016, the operation detecting unit 112 determines whether or not a touch operation (tap operation) performed on the icon of a target object has been received. When it has been determined that such a touch operation has not been detected (No in step S016), the operation detecting unit 112 returns to the processing in step S010. However, when the operation detecting unit 112 has determined that such a touch operation has been detected (Yes in step S016), the route searching unit 115 calculates the estimated arrival time at the destination if the touched target object is set as a waypoint (step S017). Note that the route searching unit 115 calculates the estimated arrival time at the destination after taking the charging time at an electric charging station into consideration.

Figure 8:
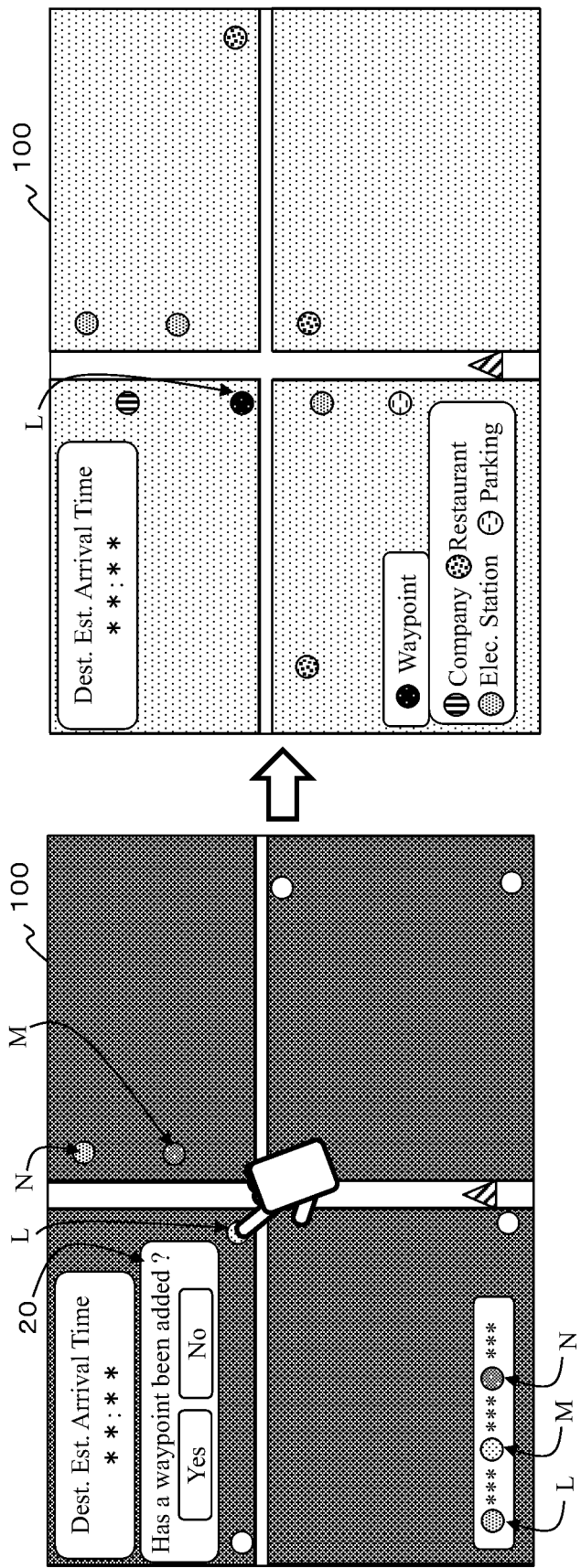
FIG. 8 is an example of a screen showing the operations performed to set a waypoint as the target object.

FIG. 8 is an example of a screen showing the operations performed to set a waypoint as the target object. As shown in FIG. 8 (left figure), when an icon of the target object has been touched, the display information generating unit 114 displays the calculated estimated time of arrival at the destination, and an icon 20 for confirming whether or not a target object should be added as a waypoint is displayed.

The input receiving unit 111 determines whether or not an instruction to add the target object as a waypoint has been received from the user (step S018). When it has been determined that no instruction has been received (No in step S018), the input receiving unit 111 returns the processing in step S010. However, when it has been determined that an instruction has been received (Yes in step S018), the route searching unit 115 sets a recommended route using the touched target object as a waypoint (step S019). The display information generating unit 114 switches from the second display mode to the first display mode, displays screen information in the first display mode (step S020), and returns to the processing in step S001.

As shown in FIG. 8 (right figure), when an instruction to set a touched target object as a waypoint has been received, the display information generating unit 114 displays screen information in the first display mode. Note that the icon L for such a target object is displayed in a display form that allows it to be identified as a waypoint.

The information display processing and operation reception processing will now be explained.

According to an information display device 100, the information of the object to be displayed can be displayed in a display form that is easier to see by an intuitive operation. In particular, the information display device 100 displays screen information in the second display mode in which information on a predetermined type of target object is arranged on a map based on a touch operation (swipe operation). As a result, the user can check screen information in which information on the object to be displayed is displayed based on an intuitive touch operation.

The information display device 100 also displays a map in the second display mode with a background color that emphasizes the target object more than in the normal first display mode. This makes it easier for the user to recognize information on the displayed target object.

The information display device 100 can also add a target object displayed in the second display mode as a waypoint with one touch. As a result, the user can add a target object as a waypoint by performing a simple operation instead of a complicated operation.

Because the information display device 100 searches for the presence or absence of target objects only within a predetermined search range, the processing load can be reduced significantly.

Modified Example of the First Embodiment

In the embodiment described above, after a touch has been detected in one of areas A to D in FIG. 2A and a swipe operation performed in a predetermined direction has been detected, electric charging stations that support three types of charging methods or electric charging stations that support all types of charging methods are identified as the target object and displayed in the second display mode. However, the present invention is not limited to this, and different types of objects can be assigned as target objects using combinations of touch positions and swipe directions.

Figures 9A, 9B:
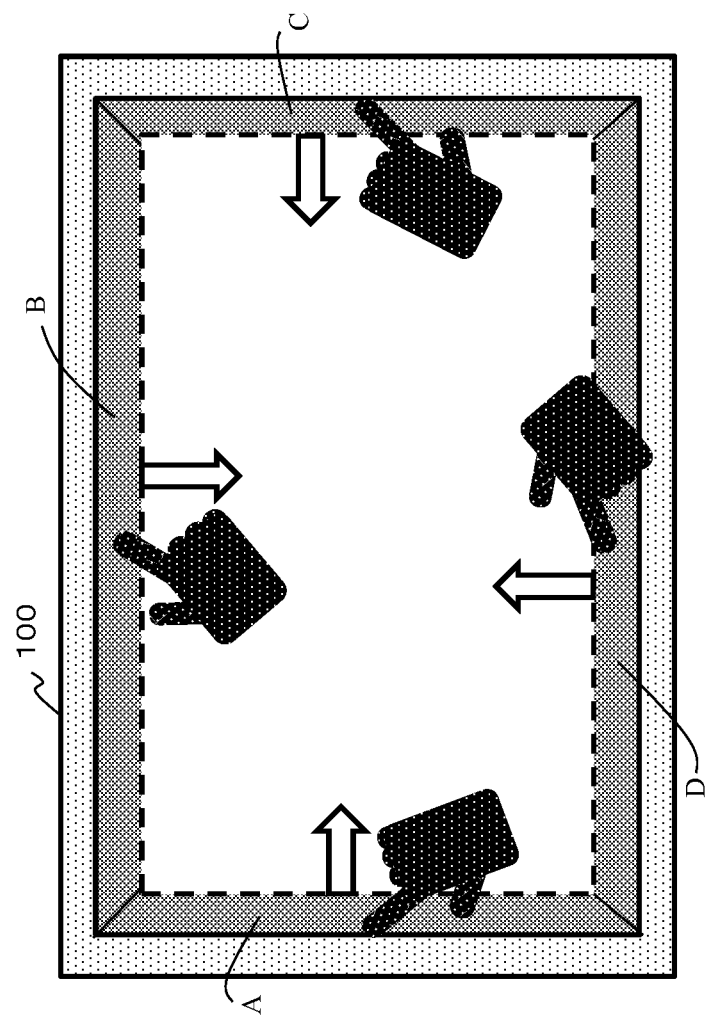
FIGS. 9A and 9B shows the relationship in a first modified example between touched positions and swipe operations and types of target objects displayed in the second display mode.

FIGS. 9A and 9B shows the relationship in a first modified example between touched positions and swipe operations and types of target objects displayed in the second display mode. As shown in this figure, in the first modified example, "gas stations with charging facilities," "parking lots," "convenience stores" and "restaurants with parking" are assigned as target objects corresponding to combinations of touch positions and swipe directions.

As a result, for example, when a touch has been detected in area B and a swipe operation in the direction of area D (downward) is detected, "parking lot" associated with this touch position and swipe direction is specified as the type of target object, and screen information in which parking lots are arranged on the map is displayed in the second display mode.

Because such an information display device 100 can assign various types of objects as target objects specified by swipe operations, usability can be improved.

Furthermore, the detection areas for touch start positions in swipe operations are not limited to areas A to D shown in FIG. 2A. For example, there may be eight areas, namely, areas O, P, Q and R of a predetermined width along the four sides of the display area along with areas S, T, U and V in the four corners.

Figures 10A, 10B:
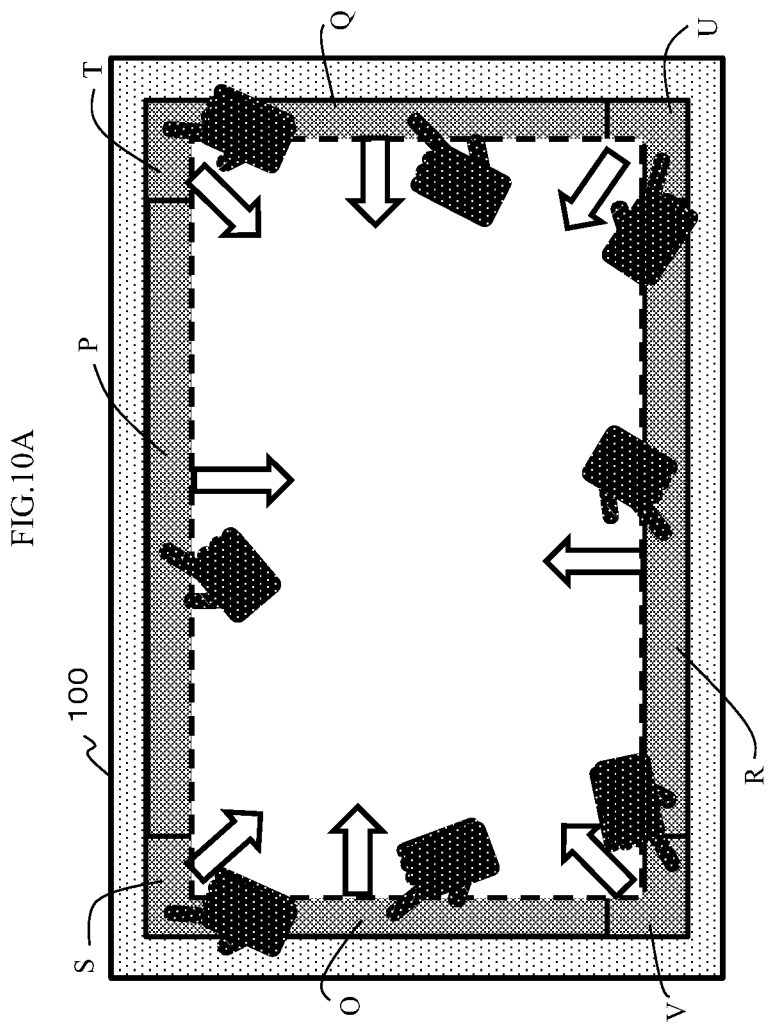
FIGS. 10A and 10B shows the relationship in a second modified example between touched positions and swipe operations and types of target objects displayed in the second display mode.

FIGS. 10A and 10B shows the relationship in a second modified example between touched positions and swipe operations and types of target objects displayed in the second display mode. As shown in the figure, in the second modified example, areas O to V are set as detection areas for the touch start positions in swipe operations.

Here, "gas stations with charging facilities," "parking lots," "convenience stores," "restaurants with parking," "fast food restaurants with parking," "cafes with parking," "public parks," and "lodging" are assigned as target objects corresponding to combinations of touch positions and swipe directions.

As a result, for example, when a touch has been detected in area O and a swipe operation in the direction of area Q (rightward) is detected, "gas stations with charging facilities" associated with this touch position and swipe direction is specified as the type of target object. Also, for example, when a touch has been detected in area S and a swipe operation in the direction of area U (downward and rightward) is detected, "fast food restaurants with parking" associated with this touch position and swipe direction is specified as the type of target object.

Similarly, for the other combinations of touch start positions and swipe directions, when a diagonal or side-to-side swipe operation relative to a touch start position is detected, a type of target object associated with this touch position and swipe direction is identified.

Because the information display device 100 described above can allocate more types of objects as target objects specified by a swipe operation, usability can be improved.

Note that in the embodiment and modified examples described above, when a touch operation in a detection area for a touch start position is detected, an icon indicating a target object of the type corresponding to the touch start position may be displayed to provide operational assistance.

FIGS. 11A and 11B shows a detection area with the touch start position and the corresponding operation assistance icon. As shown in the figure, for example, when a touch operation is performed in detection area O for a touch start position, an operation assistance icon 510 indicating "gas stations with charging facilities" corresponding to the touch start position is displayed near the touch position. Similarly, when a touch operation is performed in detection area U for a touch start position, an operation assistance icon 520 indicating "public parks" corresponding to the touch start position is displayed near the touch position. Similarly, when a touch operation is performed in another detection area for a start position, an operation assistance icon indicating the corresponding target object is displayed.

In this information display device 100, operation assistance icons indicating the target object corresponding to a touch position are displayed. In this way, when the user does not remember the touch start position corresponding to a type of target object the user wants to display in the second display mode, swipe operations for displaying the desired target object can be performed based on operation assistance icons indicating target objects.

Second Embodiment

The information display device 100 in the second embodiment is an in-vehicle device such as a display audio device that has a so-called 3D view (three-dimensional view) function that can display video around the vehicle from various angles centered on the vehicle position. Specifically, the information display device 100 performs image processing using video (or images) acquired from a plurality of in-vehicle cameras installed in the vehicle to generate and display 3D view video showing what is surrounding the vehicle (obstacles, etc.). This 3D view video is displayed in the first display mode, which is the normal display mode for the 3D view display function. The 3D view video includes information indicating a plurality of types of objects (such as facilities, vehicles, and pedestrians) in the vicinity of the terminal position (around the position of the vehicle equipped with the information display device 100) together with the vehicle itself.

The information display device 100 in the present embodiment also uses information outputted from a LIDAR (light detection and ranging) sensor mounted on the vehicle to identify the terrain around the vehicle. In addition, the information display device 100 generates and displays terrain information video in which 3D images of the vehicle itself, target objects such as facilities, and moving objects in the vicinity of the current position are arranged on a rendered image of the specified terrain. This terrain information video is displayed in the second display mode of the 3D view display function. In the terrain information video, rendered video of the terrain surrounding the terminal position (around the position of the vehicle equipped with the information display device 100) and a target object (facilities, places, and moving objects, etc. corresponding to touch operations as described later) are displayed along with a 3D image of the vehicle itself. Note that information indicating objects other than target objects is not displayed in the terrain information video.

The communication unit 130 acquires images around the vehicle and sensor information (distance measurement information) used to generate 3D view video and terrain information video via the CAN 200. The display information generating unit 114 uses information acquired via the communication unit 130 to generate a 3D view video and terrain information video.

As in the first embodiment, switching from the first display mode to the second display mode is performed when a predetermined touch operation (swipe operation) has been detected. At the same time, the display screen switches from 3D view video to terrain information video. Note that the terrain information video is generated so as to be viewed from the same viewpoint as the 3D view video displayed in the first display mode.

Also, as in the first embodiment, detection areas A to D for touch start positions are set in the display area of the display, and target objects corresponding to combinations of touch positions and swipe directions are assigned. Specifically, for example, "convenience store" is assigned to the target object corresponding to a touch operation combining a touch start position in area A and a rightward swipe direction. Also, "parking lot" is assigned to the target object corresponding to a touch operation combining a touch start position in area B and a downward swipe direction.

In addition, "restaurant with parking" is assigned to the target object corresponding to a touch operation combining a touch start position in area C and a leftward swipe direction. Also, "moving object" is assigned to the target object corresponding to a touch operation combining a touch start position in area D and an upward swipe direction.

In this situation, for example, when a touch in area A has been detected and a swipe operation in a direction toward a side (rightward direction) is detected, the object information acquiring unit 113 uses map information 121 and object information 123 to identify the locations of convenience stores in the vicinity of the current location. The search range for the target object may be set to a predetermined range centered on the current position of the vehicle (for example, a radius of 50 m to 100 m) or a search range similar to one in the first embodiment may be set. Also, when there is a convenience store within the range viewable from the viewpoint in the terrain information video, the display information generating unit 114 generates and displays terrain information video in which an icon indicating a convenience store is arranged at the corresponding position in the vicinity of the vehicle position.

Also, for example, when a touch in area D has been detected and a swipe operation in a direction toward a side (upward direction) is detected, the object information acquiring unit 113 can specify a moving object in the vicinity of the vehicle detected by the LIDAR sensor or the vehicle-mounted camera as a target object. Note that when the target object associated with the touch operation is a moving object, the search range (detection range) for the target object is the detectable range of the LIDAR sensor (for example, a range of 10 to 100 m from the vehicle position). Also, when a moving object is detected within the range viewable from the viewpoint of the terrain information video, the display information generating unit 114 generates and displays terrain information video in which an icon indicating the moving object is arranged at the corresponding position in the vicinity of the vehicle position.

Note that the set positions of detection areas for touch start positions and the corresponding swipe directions are not limited to those in the present embodiment, and can be set when appropriate within the range shown in the first embodiment.

Figure 12:
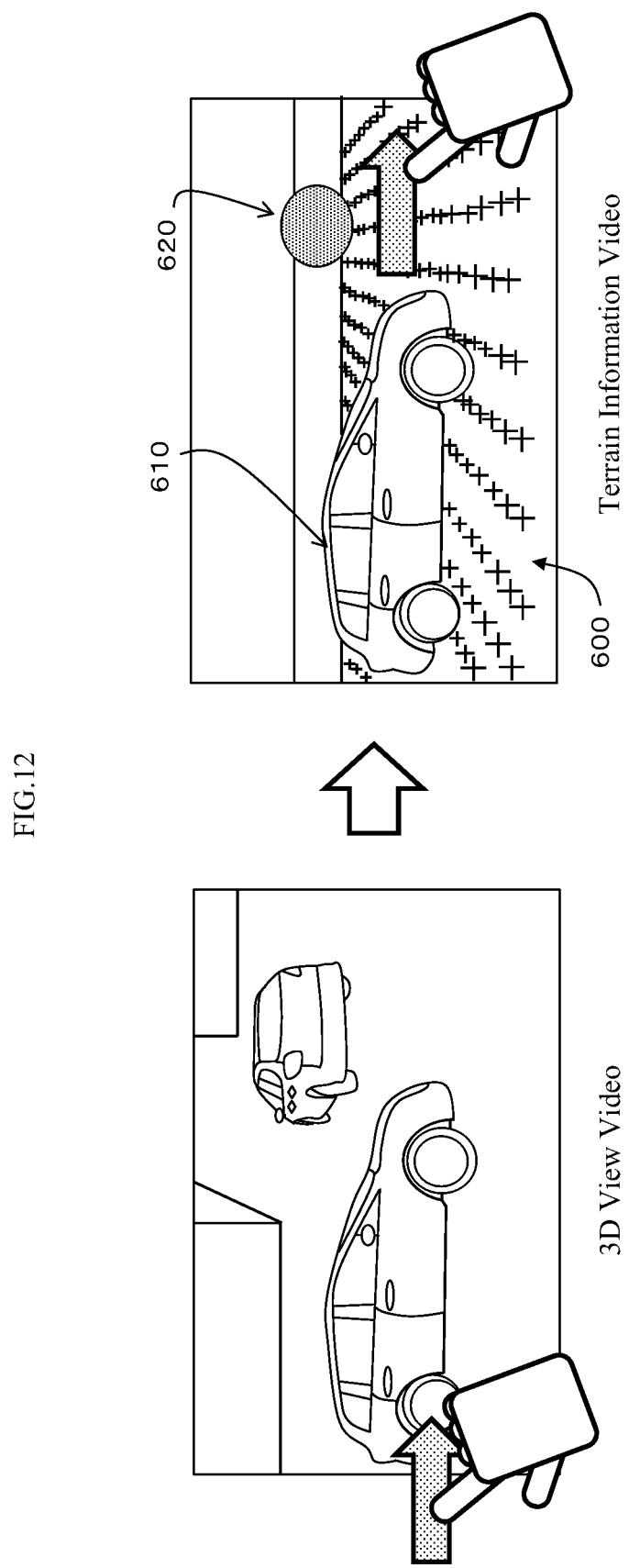
FIG. 12 shows an example of screen information during a transition from the first display mode to the second display mode.

FIG. 12 shows an example of screen information during a transition from the first display mode to the second display mode. As shown in the figure, 3D view video is displayed in the first display mode shown in FIG. 12 (left figure). When a predetermined touch operation has been detected, a transition occurs to the second display mode, and terrain information video is displayed in which 3D video 610 of the vehicle itself and an icon 620 of the target object corresponding to the touch operation are arranged on rendered terrain video 600 surrounding the vehicle.

The present embodiment can also be applied to an information display device 100 that performs display controls on the speedometer.

Figure 13:
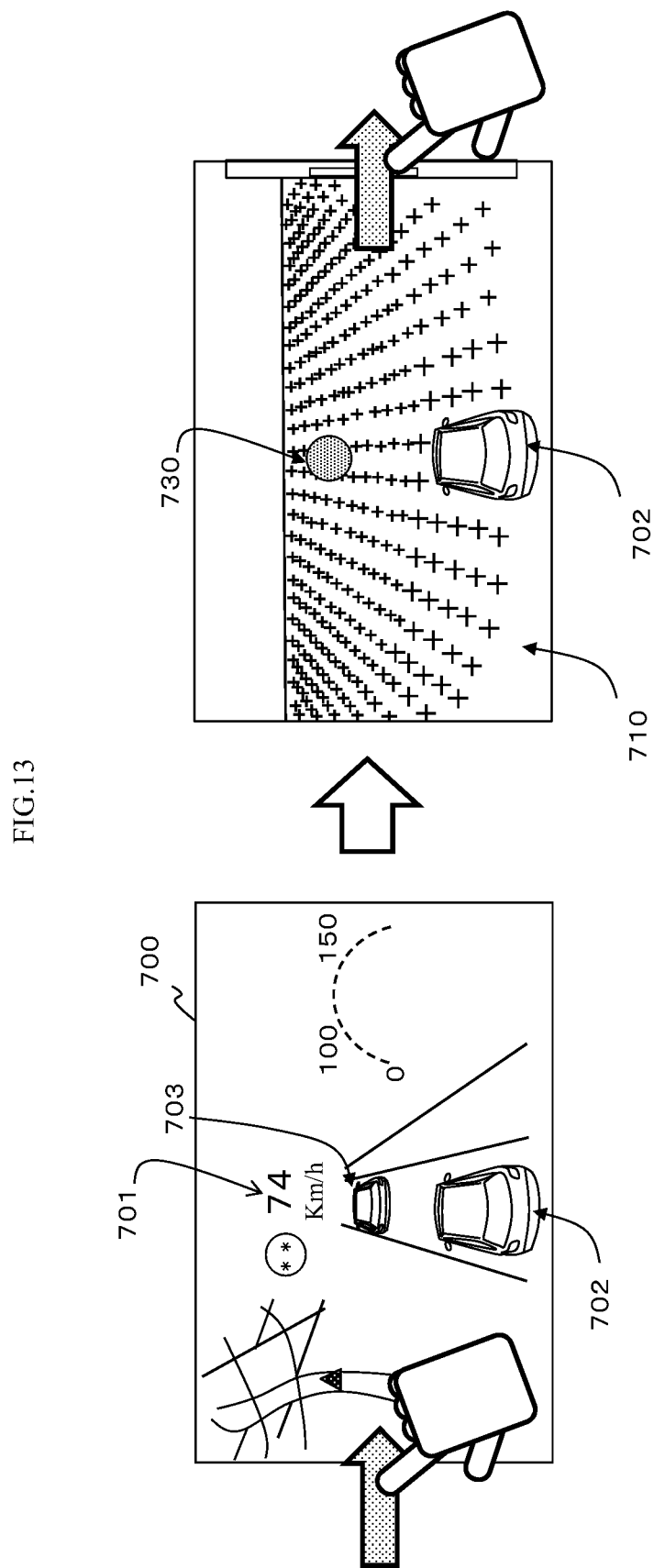
FIG. 13 shows an example of screen information during a transition from the first display mode to the second display mode on a speedometer liquid crystal display.

FIG. 13 shows an example of screen information during a transition from the first display mode to the second display mode on a speedometer liquid crystal display. As shown in the figure, the liquid crystal display 700 displays the vehicle speed 701, the vehicle itself 702, and a vehicle in front 703 of the vehicle in the first display mode. Here, when the touch operation described above is detected, a transition occurs to the second display mode, and terrain information video is displayed in which 3D video 702 of the vehicle itself and an icon 730 of the target object corresponding to the touch operation (facility or moving object) are arranged on rendered terrain video 710. Note that in FIG. 13, the vehicle in front 703 is specified as the target object (moving object), and the vehicle in front 703 is specified as the target object by an icon 730.

In the information display device 100 described above, terrain information video can be displayed in which the target object can be more easily verified by switching from the first display mode to the second display mode in response to a predetermined touch operation. Note that the terrain information video differs from the 3D view video generated using video from a vehicle-mounted camera, and is video in which an icon for the target object is arranged on rendered terrain video surrounding the vehicle position. As a result, the user can more easily recognize the presence and position of a target object in the vicinity of the user's vehicle, such as moving objects (pedestrians, animals such as dogs and cats, vehicles in front, oncoming vehicles, etc.) and facilities. As a result, the information display device 100 can make a contribution to safer driving.

The hardware configuration of the information display device 100 will now be described.

Figure 14:
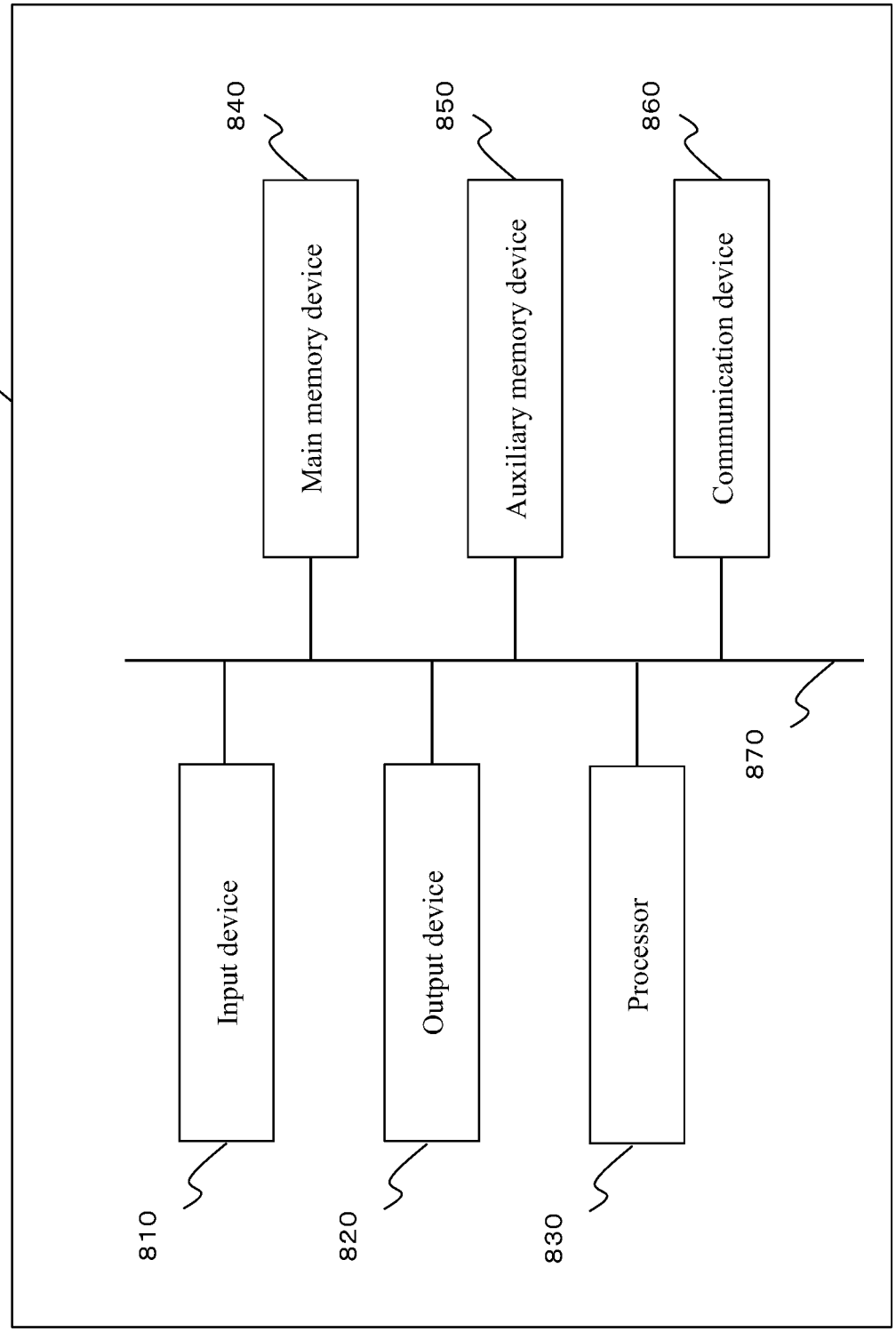
FIG. 14 shows an example of a hardware configuration for the information display device.

FIG. 14 shows an example of a hardware configuration for the information display device 100. As shown in the figure, the information display device 100 includes an input device 810, an output device 820, a processor 830, a main memory device 840, an auxiliary memory device 850, a communication device 860, and a bus 870 used to establish an electrical connection between these devices.

The input device 810 is a device used by the user to input information and instructions for the information display device 100. The input device 810 may be a pointing device such as a touch panel or a hard switch, or a voice input device such as a microphone, depending on the type of device used to embody the information display device 100.

The output device 820 is a device that outputs (displays) screen information (display information) generated by the information display device 100 as well as information acquired from an external device 400. The output device 820 may be, for example, a display and a speaker.

The processor 830 is, for example, a CPU (central processing unit) that performs arithmetic processing. The main memory device 840 can be a memory device such as a RAM (random access memory) that temporarily stores retrieved information or a ROM (read only memory) that stores programs and applications executed by the CPU as well as other information. The auxiliary memory device 850 is a non-volatile memory device that can store digital information, such as a hard disk drive (HDD), solid state drive (SSD), or flash memory.

The communication device 860 is a device that exchanges information with the external device 400 via the CAN 200, the controller 300 in the center console, or a communication network N such as the Internet. The bus 870 is a communication line that connects these devices so that they can communicate with each other.

This ends the description of a hardware configuration for the information display device 100.

Note that the processing unit 110 in the information display device 100 is realized by programs that cause the CPU in the processor 830 to perform processing. These programs are stored, for example, in the main memory device 840 or the auxiliary memory device 850, loaded into the main memory device 840 for execution, and executed by the CPU. The memory unit 120 may be the main memory device 840, the auxiliary memory device 850, or a combination thereof. Also, the communication unit 130 is realized by the communication device 860.

Note that the functional blocks of the information display device 100 have been classified according to main processing details in order to facilitate understanding of each function realized by the present embodiment. Therefore, the present invention is not limited by the method used to classify each function or by the names of the functions. In addition, each configuration in the information display device 100 can be classified in the form of even more configurational elements based on the processing details. Furthermore, a single configurational element can be classified as performing even more processing.

Some or all of each functional unit may be configured as hardware (for example, an integrated circuit such as an ASIC) mounted in a computer. In addition, the processing performed by each functional unit may be executed by a single piece of hardware or may be executed by several pieces of hardware.

The present invention is not limited to the embodiments and modified examples described above, and encompasses other embodiments and modified examples. For example, the embodiments provided above were described in detail in order to explain the present invention in an easy-to-understand manner, and the present invention is not necessarily limited to embodiments and modifications with the entire configurations described above. Also, some of the configuration of one embodiment can be replaced with a configuration from another embodiment or modification, or the configuration from another embodiment can be added to the configuration of one embodiment. In addition, some the configuration in each embodiment can be eliminated and replaced with a configuration added from another configuration.

KEY TO THE DRAWINGS

100: Information display device
110: Processing unit
111: Input receiving unit
112: Operation detecting unit
113: Object information acquiring unit
114: Display information generating unit
115: Route searching unit
120: Memory unit
121: Map information
122: Touch operation setting information
123: Object information
124: Color scheme setting information
130: Communication unit
200: CAN (controller area network)
300: Controller
400: External device
810: Input device
820: Output device
830: Processor
840: Main memory device
850: Auxiliary memory device
860: Communication device
870: Bus
N: Communication network

The invention claimed is:

1. An information display device for improving display of information in an in-vehicle information system of a vehicle, the information display device comprising:
a touch panel having a display area;
a memory; and
a processor communicatively coupled to the memory, wherein the processor is configured to:

generate screen information for display in a first display mode in which information on a plurality of types of objects is arranged around a position of the in-vehicle information system itself;
set a plurality of touch start position detection regions disposed along a periphery of the display area of the touch panel, each detection region being associated in advance with a respective type of target object from among the plurality of types of objects, the association being changeable by a user;
detect a predetermined touch operation comprising (i) detecting a touch within one of the touch start position detection regions and (ii) detecting a sliding movement from the touched detection region toward a center portion of the display area;
responsive to detecting the predetermined touch operation, acquire information on a target object that is an object of the type associated with the touched detection region within a search range around the position of the in vehicle information system itself; and
update the display area in correspondence with the sliding movement by generating screen information that transitions from the first display mode to a second display mode in which information on the target object is arranged around the position of the in-vehicle information system itself and information on objects other than the target object is hidden.

2. The information display device according to claim 1, wherein the processor is further configured to:
generate screen information for display in the first display mode in which information on the plurality of types of objects is arranged on a map, and
generate screen information for display in the second display mode in which information on the target object is arranged on the map and information on objects other than the target object is hidden when the predetermined touch operation is detected on the touch panel.

3. The information display device according to claim 1, wherein the processor is further configured to:
generate screen information for displaying, in the first display mode, a three-dimensional view (3D view) video showing what is around the vehicle using an image acquired from an onboard camera, and
generate as screen information for displaying, in the second display mode, a terrain information video in which information on the target object is arranged on the terrain information video from a predetermined viewpoint when the predetermined touch operation is detected on the touch panel.

4. The information display device according to claim 1, wherein the processor is further configured to:
determine that the predetermined touch operation has been performed when a touch operation has been detected in any one of the plurality of touch start position detection regions set along the periphery of the display area and then a sliding move of a finger has been detected toward the center portion of the display area from a touched position, and
acquire information on the target object in a search range near the position of the in-vehicle information system itself where the target object is an object of a type associated with the touched detection region.

5. The information display device according to claim 2, wherein the processor is further configured to:
display the map displayed in the second display mode in a color scheme that is different from a respective color scheme display in the first display mode.

6. The information display device according to claim 4, wherein the processor is further configured to:
display an operation assistance icon indicating the type of the target object associated with the touch start position detecting area near the touched position when it has been detected that the touch start position detecting area has been touched.

7. The information display device according to claim 2, wherein the processor is further configured to:
change a scale of the map displayed in a display area when the target object is not present in a search range so that at least one target object is included in the search range.

8. The information display device of claim 1, wherein the processor is configured to present a setting screen that enables a user to change the association between each touch start position detection region and the respective type of target object.

9. The information display device of claim 1, wherein the updating of the display area comprises progressively emphasizing the target object information and progressively diminishing non-target information in proportion to a distance of the sliding movement, and completing the transition to the second display mode when the sliding movement exceeds a threshold.

10. The information display device of claim 1, wherein responsive to the predetermined touch operation the processor executes the filtering for the associated target object type without presenting a list of categories for user selection at that time.

11. A non-transitory computer readable storage medium storing instructions for improving display of information in an in-vehicle information system, the instructions when executed by a processor cause the processor to perform a method comprising:
detecting a touch operation on a touch panel;
setting a plurality of touch start position detection regions along a periphery of a display area and associating, in advance and user-configurably, a respective type of target object with each detection region;
detecting a sliding movement from a touched detection region toward a center portion of the display area;
acquiring information on objects within a predetermined search range;
generating screen information to be displayed in a display area;
generating screen information for display in a first display mode in which a plurality of types of objects are arranged around a position of the in-vehicle information system itself;
acquiring information on a target object that is an object of a type associated with the touched detection region when the predetermined touch operation is detected; and
updating the display area in correspondence with the sliding movement to transition from the first display mode to a second display mode in which information on the target object is arranged around the position of the in-vehicle information system itself and information on objects other than the target object is hidden.

* * * * *